(12) United States Patent
Baker et al.

(10) Patent No.: US 10,686,553 B2
(45) Date of Patent: Jun. 16, 2020

(54) SIGNAL QUALITY REPORTING

(75) Inventors: Matthew P. J. Baker, Canterbury (GB); Timothy J. Moulsley, Caterham (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1320 days.

(21) Appl. No.: 12/293,289

(22) PCT Filed: Mar. 19, 2007

(86) PCT No.: PCT/IB2007/050939
§ 371 (c)(1),
(2), (4) Date: Sep. 17, 2008

(87) PCT Pub. No.: WO2007/107944
PCT Pub. Date: Sep. 27, 2007

(65) Prior Publication Data
US 2009/0075599 A1 Mar. 19, 2009

(30) Foreign Application Priority Data

Mar. 20, 2006 (EP) .................................. 06111403
Jan. 11, 2007 (EP) .................................. 07300723

(51) Int. Cl.
*H04L 1/00* (2006.01)
(52) U.S. Cl.
CPC .......... *H04L 1/0025* (2013.01); *H04L 1/0026* (2013.01); *H04L 1/0027* (2013.01); *H04L 1/0003* (2013.01); *H04L 1/0009* (2013.01)
(58) Field of Classification Search
CPC .............. H04B 17/004; H04B 17/0042; H04B 17/0067; H04B 17/0619; H04B 7/0632; H04B 7/0647; H04B 7/0697; H04B 17/007; H04B 17/0075; H04B 17/0077; H04L 1/0001; H04L 1/0019; H04L 1/0026; H04L 1/0027; H04L 1/0029; H04L 1/08; H04L 1/16; H04L 1/1671; H04L 1/18; H04L 1/1809; H04L 1/1812; H04L 1/1819; H04L 1/1887; H04L 5/0055; H04L 5/0057;
(Continued)

(56) References Cited

U.S. PATENT DOCUMENTS 2,625,395 A * 1/1953 Spangler ....................... 472/105
3,053,535 A * 9/1962 Gabrielson ................... 472/135
(Continued)

FOREIGN PATENT DOCUMENTS

EP 1309121 B1 5/2003
EP 1458118 A1 9/2004
(Continued)

OTHER PUBLICATIONS

International Search Report, PCT/US2008/010572, dated Dec. 23, 2008.

*Primary Examiner* — Yuwen Pan
*Assistant Examiner* — Paul P Tran

(57) ABSTRACT

A radio station (100) receives a first signal (R) indicative of a scheduled resource which will be used to transmit a second signal (D1, D2) to the radio station (100). In response to receiving the first signal (R), the radio station (100) is adapted to receive the second signal (D1, D2) using the scheduled resource and, prior to receiving the second signal (D1, D2), transmit an indication of received signal quality (CQI).

17 Claims, 2 Drawing Sheets

(58) Field of Classification Search
CPC ... H04L 5/006; H04L 5/0094; H04L 12/5695;
H04L 27/2608; H04L 1/0002; H04L
1/0028; H04L 1/1803; H04L 5/0023;
H04L 47/10; H04L 47/14; H04L 47/263;
H04L 47/822; H04L 47/824; H04W
24/10; H04W 28/22; H04W 52/143;
H04W 52/241; H04W 52/26; H04W
52/262; H04W 52/265; H04W 52/267;
H04W 28/18; H04W 28/24; H04W 52/04;
H04W 52/22; H04W 52/327; H04W
52/346; H04W 72/0413; H04W 72/045;
H04W 72/0453; H04W 72/085
USPC ............... 472/95, 118, 135, 103, 105, 114;
297/274, 273; 482/23–26, 34–39, 41, 77,
482/148; 455/422.1, 452.2, 509, 63.1,
455/67.14, 69; 370/20, 208, 209, 230,
370/235, 236, 252, 310, 328, 329, 331,
370/332, 333, 337, 348, 349, 33;
375/259, 260; 714/748, 751
See application file for complete search history.

(56) References Cited

U.S. PATENT DOCUMENTS

| | | | |
|---|---|---|---|
| 3,379,438 A * | 4/1968 | Stewart | 472/105 |
| 4,241,914 A | 12/1980 | Bushnell | |
| 5,483,676 A | 1/1996 | Mahany et al. | |
| 5,690,383 A * | 11/1997 | Meeker | 297/274 |
| 5,788,606 A | 8/1998 | Rich | |
| 5,873,798 A | 2/1999 | Bostick | |
| 6,240,079 B1 * | 5/2001 | Hamalainen et al. | 370/337 |
| 6,366,763 B1 * | 4/2002 | Ue et al. | 455/69 |
| 6,554,747 B1 | 4/2003 | Rempe | |
| 6,599,198 B2 * | 7/2003 | Ettenhofer | 472/104 |
| 7,912,490 B2 * | 3/2011 | Pietraski | 455/522 |
| 8,315,210 B2 * | 11/2012 | Baker et al. | 370/329 |
| 2002/0114291 A1 * | 8/2002 | Moulsey et al. | 370/328 |
| 2003/0016641 A1 * | 1/2003 | Terry | H04W 72/0413 370/335 |
| 2003/0063583 A1 * | 4/2003 | Padovani | H04B 1/7103 370/329 |
| 2003/0106006 A1 * | 6/2003 | Kwon | H04L 1/0041 714/746 |
| 2003/0236071 A1 | 12/2003 | Ito | |
| 2004/0067757 A1 | 4/2004 | Fukui | |
| 2004/0142698 A1 | 7/2004 | Pietraski | |
| 2004/0185788 A1 | 9/2004 | Terry et al. | |
| 2004/0203973 A1 | 10/2004 | Khan | |
| 2005/0100038 A1 | 5/2005 | Pietraski et al. | |
| 2005/0201296 A1 * | 9/2005 | Vannithamby et al. | 370/241 |
| 2005/0249151 A1 * | 11/2005 | Takano | H04B 7/0413 370/328 |
| 2006/0133262 A1 * | 6/2006 | Sutivong | H04L 5/0053 370/209 |
| 2006/0203727 A1 * | 9/2006 | Aizawa | H04L 1/0026 370/235 |
| 2007/0047474 A1 * | 3/2007 | Anderson | H04W 72/0413 370/277 |
| 2007/0161468 A1 | 7/2007 | Yanagisawa | |
| 2007/0254595 A1 * | 11/2007 | Yoon et al. | 455/67.14 |
| 2007/0274343 A1 | 11/2007 | Nishio | |

FOREIGN PATENT DOCUMENTS

| | | | | |
|---|---|---|---|---|
| EP | 1569492 A2 | 8/2005 | | |
| JP | 2003318814 A | 11/2003 | | |
| WO | 0038368 A1 | 6/2000 | | |
| WO | WO 02/087703 A2 | 11/2002 | | |
| WO | 2005074312 A1 | 8/2005 | | |
| WO | WO 2005074312 A1 * | 8/2005 | | H04Q 7/34 |
| WO | 2005096523 A1 | 10/2005 | | |

* cited by examiner

SIGNAL QUALITY REPORTING

FIELD OF THE INVENTION

The invention relates to a method of operating a radio station, a method of operating a communication system, a radio station, and a communication system.

BACKGROUND OF THE INVENTION

In mobile communication systems such as UMTS (Universal Mobile Telecommunication System) and cdma2000, channel quality indicator (CQI) reports are transmitted from a mobile station (MS) to a base station (BS) in order to assist the BS in selecting an appropriate transmission format (e.g. modulation and coding scheme) for downlink data transmissions, and/or to assist the BS in scheduling data transmissions to different MSs.

The following mechanisms for transmitting CQI reports are known:

a) configuring the MS to send a regular periodic CQI report (e.g. between every 2 ms and every 160 ms in the High Speed Downlink Packet Access (HSDPA) service of UMTS), by sending a signalling message to the MS at the start of the periodic reporting, and another signalling message when the period of the reporting is to be changed or the reporting terminated;

b) configuring the MS to send a single CQI report after each received data packet;

c) configuring the MS to send a single CQI report after each negatively-acknowledged data packet;

d) using a signalling message to request a single one-off CQI report from the MS.

SUMMARY OF THE INVENTION

An object of the invention is to provide improved signal quality reporting.

According to a first aspect of the invention there is provided a method of operating a radio station, comprising: receiving a first signal indicative of a scheduled resource which will be used to transmit a second signal to the radio station; and, in response to receiving the first signal, adapting the radio station to receive the second signal using the scheduled resource and, prior to receiving the second signal, transmitting an indication of received signal quality.

The invention is based on the realisation that, in a time-varying channel, efficient downlink scheduling and efficient use of adaptive modulation and coding requires up-to-date channel quality information, and that the first signal used to assign resource for transmission of a second signal can serve the additional implicit function of initiating transmission of an indication of received signal quality prior to the transmission of the second signal. In this way, the requirement for independent means of initiating the transmission of such indications is avoided, thereby improving reliability and increasing efficiency, and the indications can be more representative of the channel conditions at the time that the second signal is transmitted, also improving reliability and increasing efficiency.

According to a second aspect of the invention there is provided a method of operating a communication system comprising a first radio station and a second radio station, comprising operating the first radio station in accordance with the first aspect of the invention, and at the second radio station: transmitting the first signal; receiving the indication of received signal quality transmitted by the first radio station; and employing the indication of received signal quality to select a transmission format for transmitting the second signal to the first radio station.

According to a third aspect of the invention there is provided a radio station, comprising: receiver means for receiving a first signal indicative of a scheduled resource which will be used to transmit a second signal to the radio station; and, control means responsive to receipt of the first signal for adapting the receiver to receive the second signal using the scheduled resource and, prior to receiving the second signal, for transmitting an indication of received signal quality.

According to a fourth aspect of the invention there is provided a communication system comprising a first radio station in accordance with the third aspect of the invention and a second radio station, the second radio station comprising: transmitter means for transmitting the first signal; receiver means for receiving the indication of received signal quality transmitted by the first radio station; and control means adapted to employ the indication of received signal quality to select a transmission format for transmitting the second signal to the first radio station.

Optionally the first signal is indicative of a sequence of scheduled resources which will be used to transmit a sequence of second signals to the radio station; in response to receiving the first signal, the radio station is adapted to receive the second signals using the sequence of scheduled resources and, prior to receiving each second signal, transmit an indication of received signal quality. This can be advantageous by reducing the amount of signaling required when a sequence of data is required to be transmitted periodically. Optionally, the sequence may be periodic.

Optionally, the radio station transmits the indication of received signal quality a predetermined time prior to receiving the or each second signal. This can be advantageous in ensuring that the indication of received signal quality is representative of the signal quality when the or each second signal is transmitted.

Optionally the radio station may refrain from transmitting the indication of received signal quality when the received signal quality complies with a predetermined criterion. This can be advantageous by reducing the amount of signalling transmitted when the signal quality information is less critical. The predetermined criterion may be, as a first example, when the received signal quality is below a predetermined quality threshold, or as a second example, when the received signal quality has changed by no more than a predetermined amount in a predetermined time period.

BRIEF DESCRIPTION OF THE DRAWINGS

The invention will now be described, by way of example, with reference to the accompanying drawings wherein.

DESCRIPTION OF PREFERRED EMBODIMENTS

Figure 1:
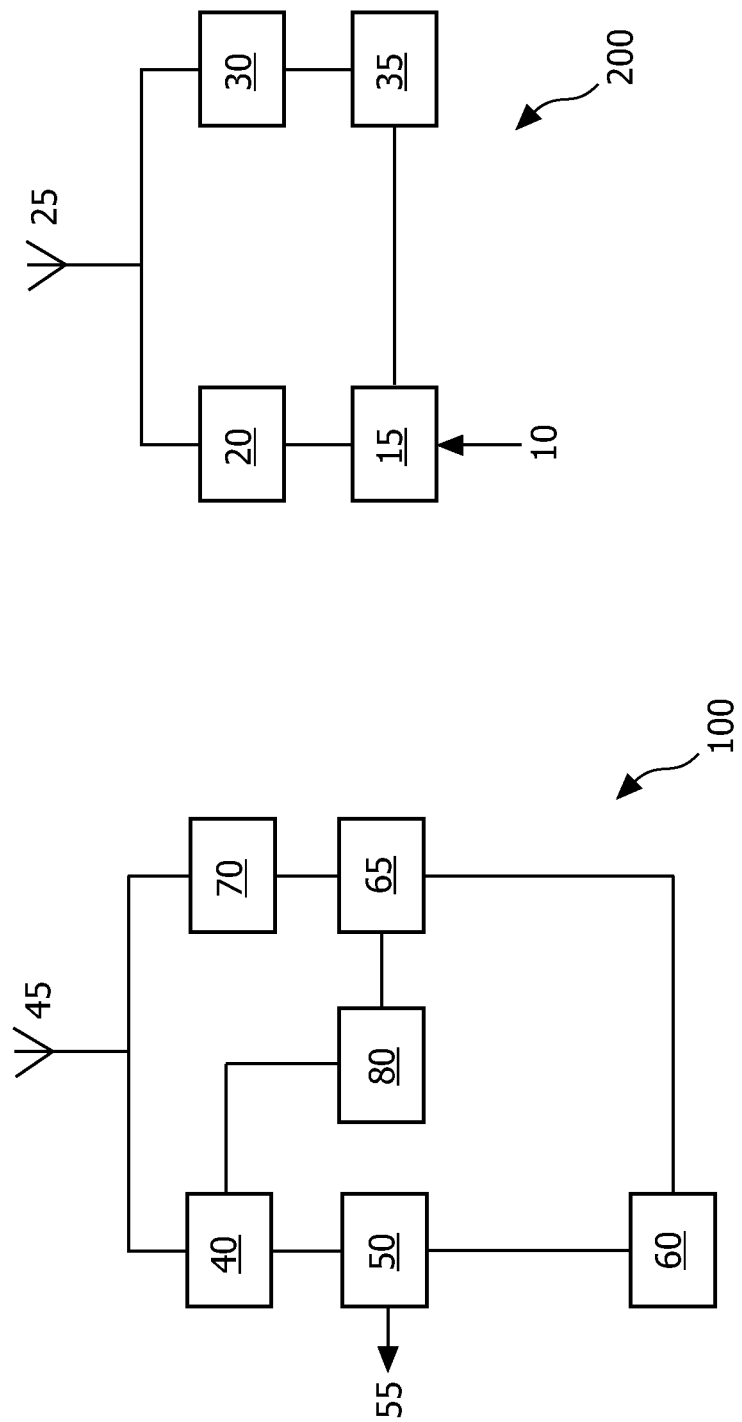
FIG. 1 is a block schematic diagram of a communication system.

Referring to FIG. 1, there is illustrated a block schematic diagram of a communication system comprising a first radio station 100 and a second radio station 200.

The first radio station 100 comprises a receiver 40 for receiving resource scheduling signals and for receiving data packets transmitted by the second radio station 200. The receiver 40 has an input coupled to an antenna 45 and an output coupled to a decoder 50 for decoding the received data packets. The receiver 40 is adapted by a controller 80 in response to the resource scheduling signals to receive the data packets using the scheduled resources. For example, the receiver 40 may be activated at a scheduled time (and save power at other times), may be configured to receive on a prescribed frequency, or be configured to receive using a prescribed channelisation code. Decoded data is delivered on an output 55 of the decoder. Coupled to an output of the decoder 50 is a selector 60 that is adapted to select one of a plurality of responses, dependent on the outcome of decoding. For example, if the decoding is successful the selector 60 may select a positive acknowledgement, whereas if the decoding is unsuccessful, for example due to errors, the selector 60 may select a negative acknowledgement. An output of the selector 60 is coupled to an input of an encoder 65 which encodes the response and delivers the encoded response to a transmitter 70 for transmission via the antenna 45 to the second radio station 200. The receiver 40 delivers an indication of received signal quality to a controller 80 which generates a CQI report which is encoded by the encoder 65 and transmitted by the transmitter 70 to the second radio station 200. The controller 80 is adapted to control the time of transmission of the CQI report. The timing of transmissions is described in detail below.

The second radio station 200 comprises an input 10 for receiving data for transmission, and an encoder 15 for encoding the data for transmission. An output of the encoder 15 is coupled to an input of a transmitter 20, and an output of the transmitter is coupled to an antenna 25. There is a receiver 30 coupled to the antenna 25 for receiving response signals and CQI reports from the first radio station 100. There is a controller 35 coupled to the receiver 30 and to the encoder 15, which is adapted to determine, dependent on the received response signal, whether a previously transmitted data packet should be retransmitted or a new data packet should be transmitted. The controller 35 is further adapted to employ the received CQI report to select a transmission format, for example modulation and/or coding, for the transmission of a data packet. The controller 35 is further adapted to select and schedule resources for transmission of the data packet, such as a time slot, a frequency, or a channelisation code.

Figure 2:
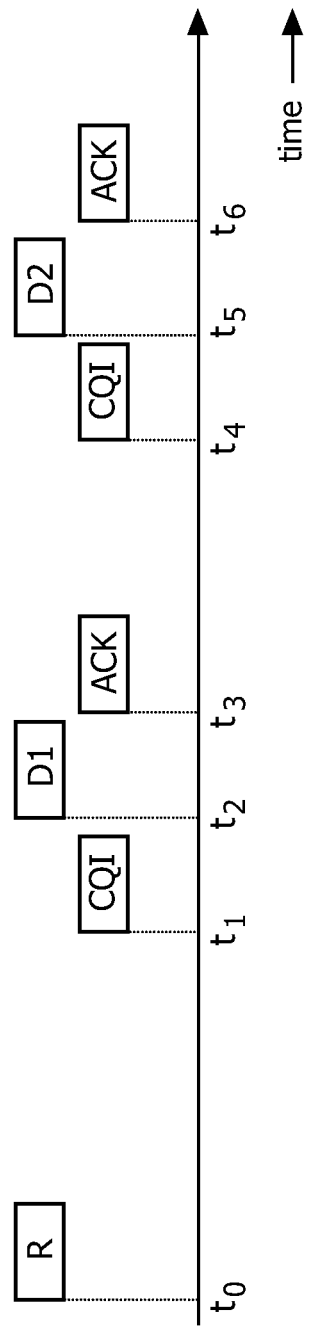
FIG. 2 is a timing diagram illustrating the transmission of a resource allocation message, data packets, acknowledgements and CQI reports.

Referring to FIG. 2, there is illustrated a resource scheduling signal R and data packets D1, D2 transmitted by the second radio station 200, and indications of received signal quality (denoted CQI and referred to as CQI reports) and acknowledgements ACK transmitted by the first radio station 100.

CQI may additionally or alternatively comprise an indication of one or more characteristics of a radio channel, such as channel state, channel transfer function, angle of arrival, channel impulse response or path loss.

The resource allocation signal R is transmitted at time $t_0$. The data packet D1 is transmitted at time $t_2$. Just prior to the transmission of the data packet D1, the first radio station 100 transmits a CQI report at time $t_1$. Thus the received signal quality indicated by the CQI report is representative of the channel conditions when the data packet D1 is transmitted. The data packet D1 is decoded successfully by the first radio station 100 and in response a positive acknowledgement ACK is transmitted at time $t_3$.

The process may be repeated when a new data packet is required to be transmitted. However, optionally, if a sequence of data packets are required to be transmitted, the resource scheduling signal R may be used to indicate a sequence of resources (which may optionally be periodic), thereby avoiding a sequence of transmissions of resource scheduling signals. This is illustrated in FIG. 2 by the transmission of a second data packet D2 at time $t_5$, with the associated CQI report just preceding at time $t_4$ and the response acknowledgement being transmitted at time $t_6$.

Optionally, the radio station transmits the CQI report a predetermined time prior to receiving the data packet, $t_2-t_1$ and $t_5-t_4$.

Optionally, the first radio station 100 may refrain from transmitting the CQI report when the received signal quality complies with a predetermined criterion. This can result in reduced signalling and increased system efficiency. As a first example, the predetermined criterion may be the received signal quality falling below a predetermined quality threshold; in this case the second radio station 200 may defer transmitting a data packet until channel conditions have changed, and may choose a different destination to transmit data to. As a second example, the predetermined criterion may be the received signal quality changing by no more than a predetermined amount in a specific time period; in this case the second radio station 200 may continue to employ the previously used transmission format. The specific time period may be, for example, a time period signalled to the first radio station 100 by the second radio station 200, or may be the time elapsed since the previous transmission of a CQI report.

The invention is applicable for data packet transmission from a base station to a mobile station, or from a mobile station to a base station, or between peer nodes.

In the present specification and claims the word "a" or "an" preceding an element does not exclude the presence of a plurality of such elements. Further, the word "comprising" does not exclude the presence of other elements or steps than those listed. The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communications and which may be used instead of or in addition to features already described herein.

The invention claimed is:

1. A method of operating a radio station, comprising:
   receiving a first signal indicative of a scheduled resource, said scheduled resource configured for use in receiving a second signal at the radio station, wherein the indication of said scheduled resource includes a transmission time slot, a transmission frequency, or a transmission channelization code, or any combination thereof;
   in response to receiving the first signal, adapting the radio station to receive the second signal using the scheduled resource indicated by said first signal; and
   prior to receiving the second signal and responsive to the first signal, transmitting an indication of channel quality, the indication of channel quality configured to enable a transmission format of the second signal to be selected for transmission of the second signal to the radio station, wherein for the second signal the transmission format includes a modulation scheme, a coding scheme, or a combination thereof.

2. The method of operating a radio station as claimed in claim 1,
   wherein the first signal is indicative of a sequence of scheduled resources, each said scheduled resources configured for use in receiving at the radio station a corresponding second signal from a sequence of second signals; and wherein the method comprises, in response to receiving the first signal, adapting the radio station to receive the second signals using the sequence of scheduled resources and, prior to receiving each said second signal in said sequence of second signals, transmitting an associated indication of channel quality.

3. The method of operating a radio station as claimed in claim 2, comprising transmitting each indication of channel quality a predetermined time prior to receiving each said second signal of the sequence of second signals.

4. The method of operating a radio station as claimed in claim 1, further comprising transmitting the indication of channel quality a predetermined time prior to receiving the second signal.

5. The method of operating a radio station as claimed in claim 1, further comprising refraining from transmitting the indication of channel quality when the channel quality complies with a predetermined criterion.

6. The method as claimed in claim 5, wherein the predetermined criterion is any of:
the channel quality is below a predetermined quality threshold; and
the channel quality has changed by no more than a predetermined amount within a predetermined time period.

7. A method of operating a communication system comprising a first radio station and a second radio station, comprising:
at the first radio station:
receiving a first signal indicative of a scheduled resource, said scheduled resource configured for use in receiving a second signal at the first radio station, wherein the indication of said scheduled resource includes a transmission time slot, a transmission frequency, or a transmission channelization code, or any combination thereof; and
in response to receiving the first signal, adapting the first radio station to receive the second signal using the scheduled resource indicated by said first signal; and
prior to receiving the second signal and responsive to the first signal, transmitting an indication of channel quality, the indication of channel quality configured to enable a transmission format of the second signal to be selected for transmission of the second signal to the radio station, wherein the transmission format includes for the second signal a modulation scheme a coding scheme, or a combination thereof and
at the second radio station:
transmitting the first signal;
receiving the indication of channel quality transmitted by the first radio station; and
employing the indication of channel quality to select the transmission format for transmitting the second signal to the first radio station.

8. A radio station, comprising:
a receiver configured to receive a first signal indicative of a scheduled resource, said scheduled resource configured for use in receiving a second signal at the radio station, wherein the indication of said scheduled resource includes a transmission time slot, a transmission frequency, or a transmission channelization code, or any combination thereof; and, a control circuit responsive to receipt of the first signal for configuring the receiver to receive the second signal using the scheduled resource indicated by said first signal and responsive to the first signal, to transmit, prior to receiving the second signal, an indication of channel quality, the indication of channel quality configured to enable a transmission format of the second signal to be selected for transmission of the second signal to the radio station, wherein the transmission format includes for the second signal a modulation scheme a coding scheme, or a combination thereof.

9. The radio station as claimed in claim 8, wherein the first signal is indicative of a sequence of scheduled resources, each one of said scheduled resources configured for use in transmitting to the radio station a corresponding second signal from a sequence of second signals; and wherein the controller is adapted to, in response to receipt of the first signal, adapt the radio station to receive the second signals using the sequence of scheduled resources and, prior to receiving each said second signal in said sequence of second signals, transmit an associated indication of channel quality.

10. The radio station as claimed in claim 8, wherein the controller is adapted to transmit the indication of channel quality a predetermined time prior to receiving the second signal.

11. The radio station as claimed in claim 8, wherein the controller is adapted to refrain from transmitting the indication of channel quality when the channel quality complies with a predetermined criterion.

12. The radio station as claimed in claim 11, wherein the predetermined criterion is one of: the channel quality is below a predetermined quality threshold and the channel quality has changed by no more than a predetermined amount within a predetermined time period.

13. A radio station comprising:
a transmitter for transmitting a first signal indicative of a scheduled resource, said scheduled resource configured for use in transmitting a second signal from the radio station, wherein the indication of said scheduled resource includes a transmission time slot, a transmission frequency, or a transmission channelization code, or any combination thereof;
a receiver for receiving, responsive to the first signal, an indication of channel quality, the indication of channel quality being configured to enable a transmission format of a second signal to be selected for transmission of said second signal from the radio station, wherein the transmission format includes a modulation scheme, a coding scheme, or a combination thereof; and
a control circuit configured to select the transmission format for transmitting the second signal based on the received indication of channel quality.

14. The radio station as claimed in claim 13, wherein the first signal is indicative of a sequence of scheduled resources, each one of said scheduled resources configured for use in transmitting from the radio station a corresponding second signal from a sequence of second signals; and wherein the controller is configured to prior to transmitting each said second signal in said sequence of second signals, receive an associated indication of channel quality if transmitted.

15. The radio station as claimed in claim 13, wherein the receiver is configured to receive the indication of channel quality a predetermined time prior to transmitting the second signal.

16. The radio station as claimed in claim 13, wherein the control circuit is configured to recognize that when the indication of channel quality has not been received the channel quality complies with a predetermined criterion.

17. The radio station as claimed in claim 16, wherein the predetermined criterion is any one of: the channel quality is below a predetermined quality threshold and the channel quality has changed by no more than a predetermined amount within a predetermined time period.

\* \* \* \* \*